United States Patent [19]
Cohen

[11] Patent Number: 5,271,179
[45] Date of Patent: Dec. 21, 1993

[54] INSECTICIDAL COMPOSITIONS AND ARTICLES OF MANUFACTURE CONTAINING THE SAME

[75] Inventor: Harold L. Cohen, Buffalo, N.Y.

[73] Assignee: Research Foundation of State University of New York, Albany, N.Y.

[21] Appl. No.: 650,954

[22] Filed: Feb. 5, 1991

Related U.S. Application Data

[63] Continuation-in-part of Ser. No. 210,239, Jun. 23, 1988, which is a continuation of Ser. No. 25,436, Mar. 13, 1987, Pat. No. 4,819,371.

[51] Int. Cl.$^5$ .............................. A01M 1/20
[52] U.S. Cl. ...................................... 43/131
[58] Field of Search .................. 43/131, 132.1

[56] References Cited

U.S. PATENT DOCUMENTS

| | | | |
|---|---|---|---|
| 229,222 | 6/1880 | Wood | 43/131 |
| 2,090,109 | 8/1937 | Coe | 167/24 |
| 2,157,449 | 5/1939 | Berg | 43/131 |
| 2,795,527 | 6/1957 | Gopp | 167/48 |
| 2,911,756 | 11/1959 | Geary | 43/114 |
| 2,956,366 | 10/1960 | Wiesmann | 43/131 |
| 3,105,321 | 10/1963 | Link | 43/131 |
| 3,653,145 | 4/1972 | Stout | 43/131 |
| 3,972,993 | 8/1976 | Kobayashi | 43/131 |
| 3,998,944 | 12/1976 | Long | 424/29 |
| 4,027,420 | 6/1977 | McKibben | 43/131 |
| 4,796,381 | 1/1989 | Kauth et al. | 43/124 |
| 4,819,371 | 4/1989 | Cohen | 43/131 |
| 5,042,194 | 8/1991 | Cohen | 43/131 |
| 5,046,280 | 9/1991 | Foster | 43/131 |

OTHER PUBLICATIONS

Parasitology Today, vol. 4, No. 7, Series of papers and centerfold, Jul. 1988.

*Primary Examiner*—Kurt C. Rowan
*Attorney, Agent, or Firm*—Howard M. Ellis

[57] ABSTRACT

Aqueous based compositions for eradicating insects comprise an insecticide, such as pyrethroid and a carrier therefor wherein the carrier is in the form of an aqueous dispersion comprising starch in an amount sufficient to provide a releasable powder-like coating of the starch and insecticide on an insect controlling device, such as a paperboard insect trap. The aqueous insecticides may be applied by printing on paper, paperboard, plastic film or textiles by means employed in the corrugated paperboard industry, but may also be applied using gluing machinery, and particularly in smaller runs on modified mimeograph type duplicating equipment with a colorant. The latter printing method provides for the uniform application of insecticide onto a substrate to deliver a predetermined amount of active ingredient.

21 Claims, 1 Drawing Sheet

INSECTICIDAL COMPOSITIONS AND ARTICLES OF MANUFACTURE CONTAINING THE SAME

CROSS REFERENCE TO RELATED APPLICATION

This application is a continuation in part of Ser. No. 210,239, filed Jun. 23, 1988, which is a continuation of Ser. No. 025,436, filed Mar. 13, 1987, now U.S. Pat. No. 4,819,371.

BACKGROUND OF THE INVENTION

The present invention relates to improved insecticide compositions and to devices containing such compositions for controlling insect populations, and more specifically, to aqueous based insecticidal compositions adaptable for application to substrates by highly efficient and economical printing means to provide improved insect traps, pest strips, tapes and ribbons, sheets, and the like.

Chagas' disease is the most common form of trypanosomiasis in the Americas. An estimated 65 million people are at risk, and an estimated 20 million people are currently infected with the disease. It is commonly transmitted by large, blood-sucking triatomine (assassin) bugs from Venezuela, *Rhodnius prolixus*. This and other species of triatomids live in the roofs and walls of dwellings of the poor throughout South and Central America. The assassin bugs prefer structures which provide shelter for them. They include structures made of adobe, bahareque, a building technique using woven twigs, leaves and mud; wood and poorly constructed concrete blocks.

The causative agent of Chagas' disease, *Trypanosoma cruzi*, lives in the blood of its human victims and of the rodents and marsupials commonly found in rural areas. It is ingested by the assassin bug as part of its blood meal. The parasite passes through the bug's digestive tract, and is deposited in its feces and then on the skin of its victim. The parasite eventually enters the circulatory system either by being scratched into a wound or through the eyes whereupon it attacks the tissues of various organs, and particularly the heart, eventually causing death of the host.

International and national public health strategies have emphasized eradicating or controlling insect vectors in order to minimize the spread of disease. Since the 1940's, the effectiveness of this strategy has depended upon the widespread use of chemical pesticides. It was once expected that pesticides alone would be sufficient to eliminate the threat of major insect-born diseases. Reliance on such a highly specialized strategy has for some time been questioned because of the problems it has caused, e.g. unintentional extermination of beneficial species, accelerated mutation of resistance to chemicals in vectors, lingering environmental pollution causing secondary public health problems, inflationary costs representing a financial drain on the fragile economies of developing nations and on the limited budgets of international agencies, and chronic organizational and bureaucratic problems which have inhibited effective delivery of services to affected populations.

In Venezuela, for example, the government's approach to building and renovating housing has been ineffective both socially and structurally. Reports indicate that some of the effectiveness of chemical sprays was neutralized within a short time period because of the lime content of white-washed walls of rural houses. The concrete block material used in new building construction fractured in a short period of two years. This, along with poor traditional construction methods, help to provide increased breeding grounds for the vector. Hence, although chemical means remain an important part of the strategies for controlling disease vectors, alternative lower cost, environmentally safe means are needed for controlling insect populations, particularly those associated with the transmission of disease. Such alternatives have been limited, e.g. by the previously unpredictable behavior which reduced the effectiveness of proposed traps.

SUMMARY OF THE INVENTION

It has now been unexpectedly discovered that the triatomid assassin bugs tend not to enter an opening which is removed from their line of travel, i.e. they tend not to search for openings but rather use them only if found in their normal path.

It is, therefore, an object of the invention to provide an insect trap which comprises a generally rectangular-shaped enclosure having outer walls defining an interior chamber, the trap comprising divider means for separating the interior chamber into adjacent substantially triangular-shaped hollow bodies, such triangular shapes having been found to be appealing to the assassin bugs. Two adjoining outer walls provide the legs of each triangular-shaped body, each body having at least one insect entrance of sufficient size generally in the region where the legs of each triangular body are adjoined to one another.

Another object of the invention is to provide an insect trap, as described above, wherein the triangular hollow bodies are right triangular shaped with two adjoining outer walls each forming a right angle with insect entrances located in the right angles.

A still further object of the invention is to provide an insect trap, as described above, which includes additional insect entrances in a planar surface of at least one leg of each right triangular-shaped body, thus intercepting any straight line of travel over the trap.

A still further object is the positioning of such entrances in such a way as to permit a darkened area within the trap in which the bug may hide during daylight.

A still further object of the invention is to provide an improved insect trap having an insecticide positioned in each hollow body of the trap.

A further principal object of the invention is to provide improved compositions and methods of application suitable for coating insect controlling devices wherein the compositions comprise an insecticide and a carrier in the form of an aqueous dispersion comprising starch in a sufficient amount which when applied to a substrate will release an insect killing amount of starch particles with insecticide upon contact by the insect.

A further object of the invention is to provide an improved insect trap, as defined above, wherein the insecticide is a contact poison printed or otherwise coated onto the interior walls of each hollow body.

DESCRIPTION OF THE DRAWINGS

For a further understanding of the invention as well as its characterizing features, reference should now be made to the following detailed description thereof taken in conjunction with the accompanying drawings, wherein.

DETAILED DESCRIPTION OF THE INVENTION

Figure 1:
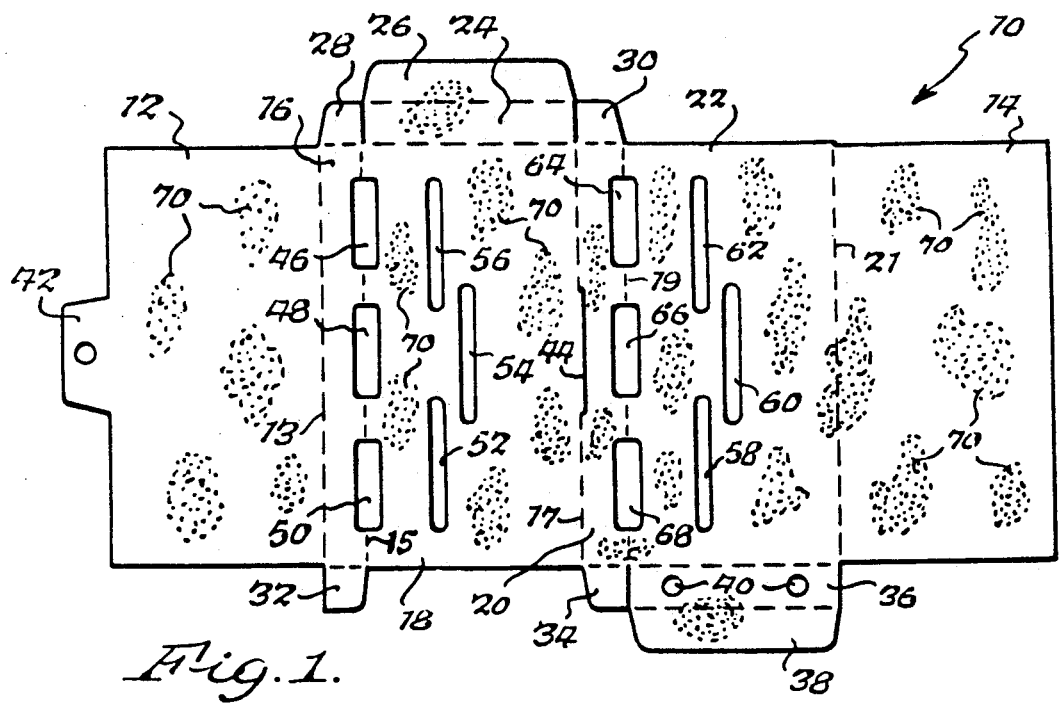
FIG. 1 is a top view of an unfolded blank for the insect trap of the invention with folding scores and insecticide applied to all interior surfaces.
Figure 2:
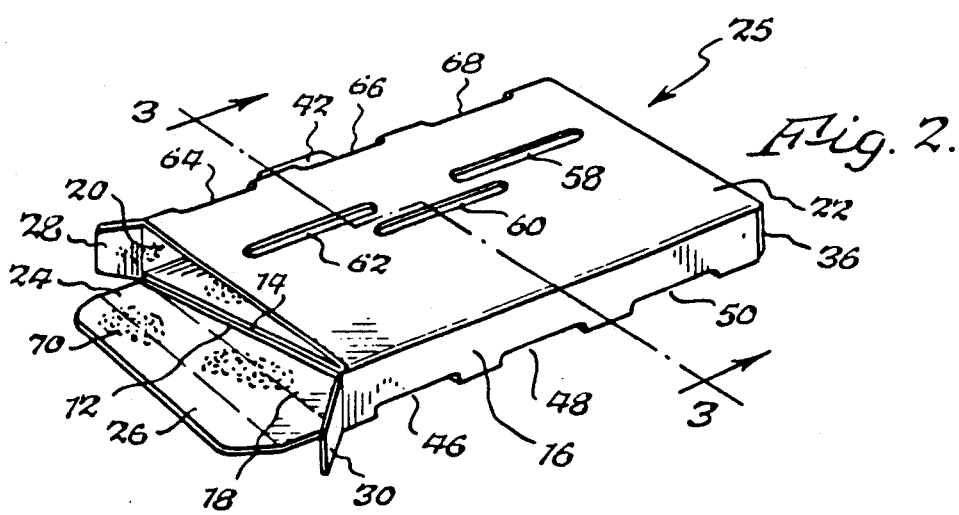
FIG. 2 is a perspective view of the assembled insect trap prepared from the blank of FIG. 1.

Turning first to FIG. 1, there is shown a paperboard blank 10 which can be folded and assembled into a useful insect trap according to FIG. 2. The paperboard blank preferably comprises an outer coating (not shown) such as a wax, synthetic polyolefin or any equivalent coating which is suitable in preventing rapid deterioration from moisture and other weather conditions. The thickness of the paperboard should also be sufficient to impart adequate rigidity to the assembled trap.

Blank 10 comprises six principal panels: first and second interior divider panels 12, 14 at each end of the blank, and first, second, third and fourth outer wall panels 16, 18, 20, 22, respectively, positioned between the first and second interior divider panels. Scoring 13, 15, 17, 19, 21 between each of the six panels permits easy folding of the blank into a generally rectangular-shaped enclosure 25. "Rectangular-shaped enclosure" for purposes of this invention is intended to mean any four-sided body having four right angles, including substantially square bodies, and bodies shaped like rectangles.

First and second outer wall panels 16, 18 are perforated to form edge-type insect entrances 46, 48, 50 which overlap both outer wall panels. Third and fourth outer wall panels 20, 22 also have multiple edge-type insect entrances 64, 66, 68 overlapping the two panels. Insect entrances should be sufficiently wide to allow easy entry of the largest species being eradicated in a particular situation. This would include large openings for the triatomine vector, as well as for cockroaches including the American, German and Madagascar species. Obviously, smaller species of insect vectors like bedbugs and lice of which the insect traps disclosed herein are useful, can have entrances of smaller dimension.

Edge-type insect entrances 46, 48, 50, 64, 66, 68, are shown spaced from one another. By spacing the insect entrances from each other added structural rigidity and strength are imparted to the trap. However, the present invention contemplates at least one edge-type entrance for each of the pairs of outer wall panels. Thus, for example, instead of multiple entrances 46, 48, 50 being spaced from one another, the invention also contemplates the use of a single large insect entrance in place thereof.

Blank 10 preferably includes particularly for the triatomine vector additional spaced slots 52, 54, 56 as entrances in the second outer wall panel 18. Additional spaced slots 58, 60, 62 as insect entrances are also preferred in the fourth outer wall panel 22. The additional insect entrances should be in close proximity to edge-type entrances in order to restrict the amount of light entering the confined areas favored by the triatomine vector, as more fully discussed below. It is preferred that the additional spaced slots be generally parallel with the edge type insect entrances because the triatomine vector's tendency to travel in a nonsearching, straight path.

Blank 10 also includes means for forming an enclosure, i.e. tabs 28, 30 and end-closure 24, 26; tabs 32, 34 and end-closure 36, 38. Closure 36 may also have observation openings 40 for visual checking for insects. In addition, an assembly tab 42 at the end of the first divider panel 12 may be used as a suspending means for hanging traps on walls, etc. Tab 42 engages with slit 44 at the time of assembly.

The surface of the blank which will form the interior walls of the trap can be treated with appropriate insecticidal compositions 70 (FIGS. 1 AND 2). Especially novel compositions for application to the insect trap walls, as well as for application to other insect controlling devices like pest strips, fly papers, tapes, ribbons, sheets, etc., according to the present invention are those comprising an insecticide and a carrier or vehicle therefor. The carrier consists of an aqueous dispersion of starch, preferably any finely milled starch of vegetable origin e.g. seeds of rice, corn, potato and wheat. The important novel feature of this aspect of the invention is that the starch is employed in a sufficient amount such that when applied to the substrate i.e. surface of the insect controlling device, starch particles with toxic amounts of insecticide sorbed thereon are released from the substrate on contact by the insects. This is intended to exclude viscous starch compositions that are pasty or glue-like in consistency. Such compositions harden upon drying and fail to release the desired toxic amounts of insecticide to provide efficient knockdown and kill rates.

While not wishing to be held in any specific mechanism of action, nevertheless it is believed the insecticide becomes absorbed or adsorbed onto the starch particulates in the aqueous dispersion. The quantity of starch present in the dispersion should be sufficient to provide a uniform powder-like coating or dusting of insecticide on the substrate, especially when printed or rolled onto the substrate and allowed to dry. It was discovered that with this concentration of starch the particles are readily released from the coated substrate upon contact by insects. The particles appear to adhere to the legs or other appendages of insects. It is believed that contact poisons, such as permethrin and other pyrethroids, for example, are desorbed or released from the starch particles and readily absorbed acting systemically on the central nervous system to kill insects usually within a short period.

The carrier of the insecticide compositions generally contains from about 5 to about 110 percent weight-in-volume of starch based on water in the dispersion, and more preferably, from about 50 to about 100 percent weight-in-volume of the starch based on volume of water present in the dispersion. Weight-in-volume —(w/v)—is intended to denote its ordinary meaning, namely the number of grams of starch per 100 ml. of water in the dispersion.

As previously indicated, the quantity of starch in the dispersion is an important and key aspect of the invention. Dispersions of starch, for example, which exceed the upper end range disclosed hereinabove are less effective because they are too viscous, and have consistencies of glues and pastes. Insecticidal compositions having the consistency of glue or paste readily adhere to the substrate and become hard on drying, and consequently, there is inadequate release of insecticide from the substrate to provide efficient rates of kill. While the more dilute dispersions containing less than 50 percent weight-in-volume starch per 100 ml of water have slower rates of kill than the higher preferred range, they are nevertheless generally effective vehicles for insecticides. The more dilute dispersions provide the desired uniform powder-like coating of insecticide on the substrate which is readily released from the substrate with contact by insects.

Suitable insecticides include a broad range of synthetic and natural materials, such as the halogenated organics, particularly chlorinated types like gamma-benzene hexachloride; esters of phosphoric acid like dichlorvos, and particularly the pyrethroids which have been shown to be highly effective against Chagas' disease vectors. Representative examples of pyrethroids include deltamethrin, cypermethrin (available under the Cymbush trademark), fenpropthrin, all of which have been successfully used in controlling Chagas' disease vectors. Others include cyflutherin (Bayer) and permethrin (FMC). Typically, pyrethroids are applied at the rate of from about 0.1 to about 7 $g/m^2$; phosphoric acid esters at about 4.0 to about 12 $g/m^2$ and halogenated organics at the rate of about 3 to about 15 $g/m^2$. The pyrethroids are all well known contact poisons which penetrate the blood directly through the insect cuticle.

In addition to the aqueous starch dispersions, the insecticide compositions disclosed herein contemplate various optional additives, such as attractants, sustained release additives and colorants, including inks, pigments and dyes. In this regard, the insecticidal compositions may also include various known attractants to lure insects into the trap or other insect controlling device. Representative examples include sex hormones, sugars like sucrose or other equivalent sweetening agents and certain organic chemicals like acetone and toluene, the latter of which have been thought to be of some value in attracting Chagas' disease vectors because they may simulate human respiratory or metabolic breath components. It has also been found, in some instances, attractants like sugar may enable the use of reduced quantities of starch in the compositions because insects tend to feed on the coating itself.

It has also been discovered that the rate of release of insecticide from a coated substrate may be modified by the addition of sodium silicate, and more preferably, silica flour, the latter being commercially available from Riverside Chemical Company, N. Tonawanda, N.Y. In order to reduce the rate of release, or for a more sustained rate of release the insecticide compositions may contain from about 1 to about 15 percent by weight of these additives.

In addition to the foregoing, it has been found advantageous to also incorporate a colorant into the insecticide compositions aid in the identification of substrates or substrate surfaces having the poisonous material applied thereto. Because the aqueous insecticidal compositions dry into essentially colorless coatings the addition of a small amount of any inert colorant material, such as an ink, dye or pigment to the formulation will aid in identifying surfaces coated with the compositions for safer handling of coated articles by manufacturers and consumers.

The insecticide-containing compositions described herein have the added benefit, namely properties which permit application by convenient and efficient printing means to paper, paperboard, cardboard, plastic and textile-fabric type substrates by offset printing methods. Although application by printing means offers important advantages, other methods of application may also be employed, such as by rollers, for both aqueous and non-aqueous based printing inks, brush and spraying techniques.

The present invention also contemplates, particularly for larger production runs, the application of the insecticide compositions to paperboard and other similar substrates by equipment and machines closely allied with the manufacture of corrugated paperboard, folding boxes, envelopes and tape making. Representative examples of suitable machines and apparatus for applying the aqueous starch/insecticide compositions are the Speed King gluing machine manufactured by the International Paper Box Machine Corporation, and a corrugated single face type machine manufactured by the Langston Corporation. This latter gluing machine can perform single, double or triple gluing in affixing the outer paperboard faces to the inner corrugated core. Suitable machines for gluing and folding envelopes which may be used in the application of starch-water based insecticides are those available from W and D Machinery Company, Kansas City, Mo. and F. L. Smith, Inc., Dunkerville, Pa.

Accordingly, a further aspect of the invention provides for a method of applying the dispersions disclosed hereinabove by the steps of:

(a) providing an aqueous dispersion comprising the starch and insecticide;

(b) providing a machine suitable for applying a gluing composition to articles selected from the group consisting of paperboard, folding boxes, envelopes, and tape;

(c) loading the machine with the insecticide-containing dispersion, and (d) applying a coating of the dispersion to the substrate.

In fabricating insect traps with the insecticide compositions, including the improved traps described herein, the paperboard stock can be most conveniently coated with the compositions prior to being stamped into blanks. That is, the surface of an entire sheet of paperboard can be treated by spraying, brushing, painting, printing and the like, prior to or even after being formed into an insect trap blank. For smaller scale production useful printing methods according to the present invention provide for mimeograph type printing with equipment, such as that available from A. B. Dick Company which normally employs a stencil on a rotating drum through which ink is pressed. The insecticide compositions can be readily and efficiently applied using such duplicating equipment, however, modified by removing the stencil customarily used on the rotating drum. The pad on the drum below the stencil has been found to be useful in applying the starch based insecticidal compositions.

The improved method of applying insecticide with the modified mimeograph machine was quite unexpected because it was anticipated that the flow rate of the aqueous compositions from this equipment would result in possible over saturation or flooding of substrate surfaces. Surprisingly however, it was found that the starch component of the insecticide serves as a "built-in" flow regulator for the insecticide during the printing process. It is believed that the starch employed in the amounts disclosed herein increases the viscosity of the composition sufficiently to prevent excess dispersion flowing from the pad mounted on the drum from saturating or flooding the paperboard stock. This is important economic and technical advantage over other methods of application because the compositions are uniformly metered from the press or gluing device only in amounts needed to provide coatings which yield high kill rates. Accordingly, a further aspect of the invention includes the discovery that a carrier or vehicle for coating compositions containing a starch component can be readily applied using standard duplicating/mimeograph equipment for efficient application to substrates with minimal capital outlay especially for small production runs.

Accordingly, the process of printing a dispersion onto a substrate according to the invention includes the steps of:

a) providing a dispersion containing a sufficient amount of starch particulates;

b) providing a mimeograph-type printing device with a drum pad and without a duplicating stencil, and c) applying a coating of the dispersion onto a printable substrate by loading the printing device with the dispersion.

Blank 10 can be easily assembled into an insect trap like that shown in FIG. 2 by folding the first diagonal divider panel 12 over the second outer wall panel 18 which is secured by inserting assembly tab 42 through slit 44. A first substantially triangular-shaped hollow body is formed. The expression "substantially triangular shaped" is intended not only to include three-sided bodies, but also bodies which may have a fourth side. i.e. a wall is used in place of the apex of the triangular. An adhesive (not shown) is preferably applied to the backside of divider panel 12 and second diagonal divider panel 14 folded over so the backside of panel 14 makes physical contact with the adhesive applied to panel 12. This forms an internal chamber divided diagonally into adjacent triangular-shaped hollow bodies. Tabs and end-closures are then folded inwardly to form a sturdy, economical insect trap which can be mass produced at a cost which makes it affordable for use by populations of the poor in need throughout South and Central America.

Figure 3:
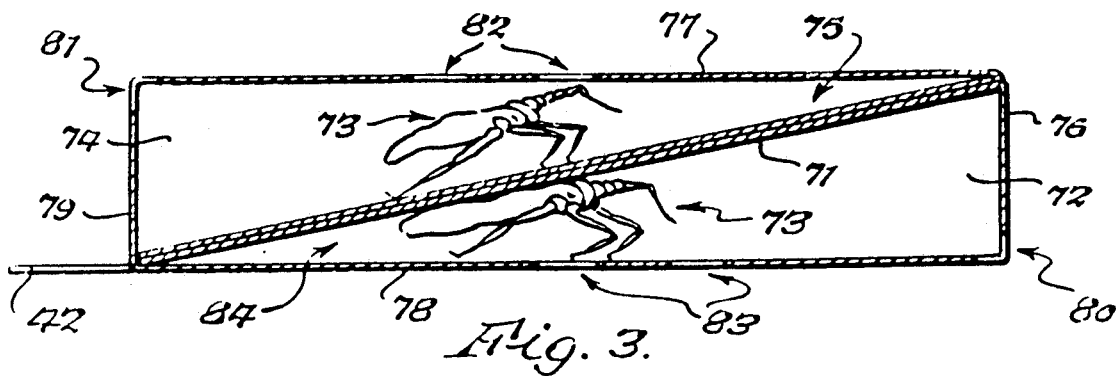
FIG. 3 is an enlarged end sectional view taken along line 3—3 of FIG. 2 with assassin bugs positioned in the regions of the vertex of the triangular-shaped hollow bodies.

FIG. 3 provides an end-sectional view of the generally rectangular-shaped trap of FIG. 2 with divider means 71 separating the trap into adjacent right triangular-shaped hollow bodies 72, 74. The hollow bodies provide dual insect chambers which are especially attractive to the vector of Chagas' disease, such as the triatomid *Rhodnius prolixus* 73. In this regard, the insect, which is nocturnal, seeks shelter in closely confined spaces during the light hours. Behavioral studies have shown that this insect vector prefers structures which will not only shelter them from daylight, but also confining areas which allow the posterior portions of their bodies to be easily nestled up to and make contact with surfaces of the shelter. Hence, the vertex regions 75, 84 of right triangular hollow bodies 72, 74, respectively, provide the type of close confining shelter which assassin bugs find especially alluring.

The bugs enter the trap at lower level entrances 80, 83 or upper level entrances 81, 82 (FIG. 3). In this regard, it will be observed the generally right angular configuration at entrance 80 formed by right triangle legs 76, 78, and right angular configuration at entrance 81 formed by right triangle legs 77, 79. This type of opening provides easy access to the trap interior chambers without emitting excessive light to the vertex regions.

Entrances 82, 83 provide added assurance that the insect will enter the trap especially when approaching the outside wall along triangle legs 77, 78 at a point distal from edge entrances 80, 81. The location of alternative entrances 82, 83 should be in proximity to edge entrances to restrict the amount of light entering the interior of the trap in vertex regions 75, 84.

Although it is desirable for the triatomine vector to remain inside the trap, in the event it quickly exits the trap the coating of contact poison, permethrin, on the interior surfaces of the trap is readily absorbed and will kill the insect usually within a few hours or even less.

An early design of an insect trap for the triatomine vector was described in a paper presented at a workshop on Sep. 17, 1984 by Harold L. Cohen during a meeting of the XI International Congress for Tropical Medicine and Malaria in Calgary, Canada. This pioneering work did establish the validity of insect traps as a potentially useful means for controlling the triatomine vector. However, test results with this earliest trap did not prove to be totally acceptable because of relatively small reductions in insect populations. It is thought that the locations of the insect entrances and/or possibly the dimensions of the openings and other design features were the primary cause of the generally unacceptable results with this earliest insect trap. As this point the unexpected "line of travel" behavior of the insect was either not known or not recognized as being important.

The following specific examples demonstrate the various embodiments of the invention, however, it is to be understood that these examples are for illustrative purposes only and do not purport to be wholly definitive as to conditions and scope.

EXAMPLE I

In order to demonstrate the effective proportional ranges of starch in dispersions containing insecticide the following experiment was conducted:

Five aqueous starch dispersions with finely milled potato starch were prepared for each of two days with the following proportions:

a) 50 grams starch to 100 grams water
b) 60 grams starch to 100 grams water
c) 75 grams starch to 100 grams water
d) 100 grams starch to 100 grams water
e) 125 grams starch to 10 grams water Each dispersion (a-e) contained 25 grams of cyfluthrin (15 to 20% active ingredient) a permethrin type pyrethroid. Two series of tests were performed on different days to determine average kill times for German roaches on hot pressed papers coated with the dispersions. The dispersions were applied with a sponge-like applicator which provided a thin, but equal amount of the compositions on individual paper samples.

The average knockdown times for the trials were as follows:

a) With 50% w/v, roach on its back in 20 minutes
b) With 60% w/v, roach on its back in 10 minutes
c) With 75% w/v, roach on its back in 6 minutes
d) With 100%, roach on its back in 10 minutes
e) With 125% w/v, roach was still alive after 1 hour The above test results show the overall best knockdowns were achieved with dispersions containing from 50 to 100 percent w/v starch with the best performance being provided by compositions containing 75 percent starch (c). Those containing 50 percent starch were somewhat slower possibly because of the lower concentration of starch. However, the knockdown time was still acceptable. Those containing 125 percent starch (e) had a consistency of paste or glue, and did not allow for the release of sufficient starch particles containing insecticide.

EXAMPLE II

Compositions having the following formulations were prepared:

| PART A | |
|---|---|
| Permethrin* | 25.0 grams |
| Triton 193 | 12.5 grams |
| Silica flour | 12.5 grams |
| Cream corn starch | 25.0 grams |
| Table sugar (granulated | 50.0 grams |
| Brown Pelican ink | 5.0 ml |
| Water | 400.0 ml |
| Acetone | 12.5 grams |
| Toluene | 12.5 grams |

Liquid form of ((3-phenoxyphenyl) methyl (±) cis/trans 3-(2-dichloroethenyl)-2, 2-dimethylcyclopropanecarboxylate) (FMC Corp.)

Water and starch were first mixed together to form an aqueous dispersion or suspension. Sugar as an attractant was then added to dissolve in the dispersion. The silica flour was then incorporated into the dispersion. Triton-193, a wetting agent, was then added to improve the wettability of the pyrethroid in the dispersion. After incorporating the Permethrin the acetone and toluene were added for enhancing attraction for triatomids. The ink was then mixed into the dispersion as an indicator.

The composition of Part A was suitable for printing onto 22 Pt claycoat paperboard used in making the insect traps according to FIGS. 1 and 2 of the drawings.

| PART B | |
|---|---|
| Cymbush 3E* | 175 grams |
| Silica flour | 87.5 grams |
| Cream cornstarch | 175 grams |
| granulated sugar | 700 grams |
| water | 2800 ml |
| Acetone | 87.5 grams |
| Toluene | 87.5 grams |
| colored dye | qs. |

*Active ingredient 35.6% cypermethrin

The compositions of Parts A and B were applied to the insect traps of FIGS. 1 and 2 which in-turn were tested against *Triatoma infestans* from second, third and fourth in-star levels. Knockdown times were measured. Length of time for paralysis was observed to range from between 39 minutes on the back with no movement in two hours. Kill times for adult species were observed to range from 40 minutes up to 1½ hours. The differences in time are believed to be due to variations in weight and degree of movement of the organism on the treated surfaces of the traps.

Although the invention has been described in considerable detail with respect to the preferred embodiements thereof, it will be apparent that the invention is capable of numerous modifications and variations to those skilled in the art without departing from the spirit and scope of the invention, as defined in the appended claims.

I claim:

1. A composition comprising an insecticide and a carrier therefor, said carrier being in the form of an aqueous dispersion comprising starch particles present in a sufficient amount which when applied to a substrate will release an insect killing amount of starch particles with insecticide upon contact by the insect.

2. The composition of claim 1 wherein the amount of starch present in the dispersion is sufficient to provide a powder-like coating of starch and insecticide on the substrate surface when substantially dry.

3. The composition of claim 1 wherein the starch in the dispersion is present in an amount ranging from abut 5 to about 110 percent weight-in-volume based on water in said dispersion.

4. The composition of claim 2 wherein the starch in said dispersion is present in an amount ranging from about 50 to about 100 percent weight-in-volume based on water in said dispersion.

5. The composition of claim 3 including an agent selected from the group consisting of insect attractant, colorant, insecticide release extender and mixtures thereof.

6. The composition of claim 1 including a member selected from the group consisting of printing ink, pigment and dye.

7. The composition of claim 5 including a member selected from the group consisting of printing ink, pigment and dye.

8. The composition of claim 6 including an insect attractant.

9. The composition of claim 7 including an insect attractant.

10. The composition of claim 1 including an insecticide selected from the group consisting of a pyrethroid, a chlorinated organic compound and a phosphoric acid ester.

11. The composition of claim 10 including a material selected from the group consisting of sodium silicate and starch flour.

12. An insect trap comprising a coating of the composition of claim 1.

13. An insect trap comprising a coating of the composition of claim 2.

14. An insect trap comprising a coating of the composition of claim 3.

15. An insect trap comprising a coating of the composition of claim 5.

16. An insect trap comprising a coating of the composition of claim 6.

17. An insect trap blank comprising a coating of the composition of claim 10.

18. An insect trap blank comprising a coating of the composition of claim 1.

19. A pest control strip comprising a coating of the composition of claim 1.

20. A paperboard sheet comprising a coating of the composition of claim 1.

21. An insect trap comprising a generally rectangular-shaped enclosure having interconnected outer side walls and outer opposing end walls engaging with said side walls to provide a closed interior chamber, said trap comprising divider means for separating said closed interior chamber into adjacent substantially traiangular-shaped hollow bodies in which at least two adjacent outer side walls provide the legs of each substantially triangular-shaped hollow body, each body of said trap having at least one insect entrance of sufficient size located in said adjacent outer side walls, said trap having a coating composition comprising an insecticide and a carrier therefor, said carrier being in the form of an aqueous dispersion comprising starch present in a sufficient amount which when applied to said trap will release an insect killing amount of starch particles with insecticide upon contact by the insect.

* * * * *